United States Patent
Bornemann et al.

[11] Patent Number: 6,043,577
[45] Date of Patent: Mar. 28, 2000

[54] FLYWHEEL ENERGY ACCUMULATOR

[75] Inventors: Hans Bornemann, Calw; Christian Maas, Stuttgart; Klaus Weber, Stutensee; Hermann Reitschel, Forst; Hans-Joachim Gutt, Stuttgart, all of Germany

[73] Assignee: Forschungszentrum Karlsruhe GmbH, Karlsruhe, Germany

[21] Appl. No.: 09/131,595

[22] Filed: Aug. 10, 1998

Related U.S. Application Data

[63] Continuation-in-part of application No. PCT/EP97/00924, Feb. 26, 1997.

[30]    Foreign Application Priority Data

Mar. 2, 1996 [DE] Germany .......................... 196 08 099

[51] Int. Cl.[7] .............................. H02K 7/02; F16C 32/04
[52] U.S. Cl. .......................... 310/74; 310/90.5; 310/178; 74/572
[58] Field of Search ................... 310/90.5, 178, 310/74; 74/572, 573 R

[56]          References Cited

U.S. PATENT DOCUMENTS

| | | | |
|---|---|---|---|
| 4,385,251 | 5/1983 | Mallick et al. | 310/178 |
| 5,214,981 | 6/1993 | Weinberger et al. | 74/573 R |
| 5,270,601 | 12/1993 | Rigney, II | 310/90.5 |
| 5,495,221 | 2/1996 | Post | 310/90.5 |
| 5,747,426 | 5/1998 | Abboud | 310/90.5 |
| 5,801,469 | 9/1998 | Takahata et al. | 310/90.5 |

FOREIGN PATENT DOCUMENTS

| | | | |
|---|---|---|---|
| 0 526 903 | 2/1993 | European Pat. Off. | F16C 39/06 |
| 2 565 310 | 12/1985 | France | F16F 15/30 |
| WO 95/07193 | 3/1995 | WIPO | B60K 1/02 |

OTHER PUBLICATIONS

Bornemann et al., "Schwungradenergiespeicher Mit Passiven Supraleitenden Magnetischen Lagern", KFK–Nachricthen 26, Mar. 1994, pp. 209–214.

H.J. Bornemann et al., "Low Friction in a Flywheel System with Passive Superconducting Magnetic Bearings", Applied Superconductivity, vol. 2, Nr. 7/08, Jul. 1, 1994.

Tixador et al., "Hybrid Superconducting Magnetic Suspensions", IEEE Transactions on Magnetics, vol. 32, nr. 4, Jul. 1996, pp. 2578–2581.

*Primary Examiner*—Nestor Ramirez
*Assistant Examiner*—Burt Mullins
*Attorney, Agent, or Firm*—Klaus J. Bach

[57]              ABSTRACT

In a flywheel energy accumulator comprising a vertical shaft rotatably supported in a vacuum housing by superconductive magnetic axial support bearings, lower and upper flywheels are mounted on the shaft in axially spaced relationship, a homopolar dynamic machine with a rotating magnetic field is disposed in the space between the flywheels and includes a stator supported in, or forming part of, the housing and a rotor mounted on the shaft so as to be disposed within the rotor, and the superconductive magnetic supporet bearings include a lower passive axial thrust bearing with an annular magnet disposed below the lower flywheel and an upper positive axial pull bearing with an annular magnet disposed above the upper flywheel and disc-shaped superconductors disposed adjacent the annular magnets such that both bearings provide magnetic forces jointly counteracting the gravity forces of the shaft, the rotor and the flywheels.

7 Claims, 2 Drawing Sheets

FLYWHEEL ENERGY ACCUMULATOR

This is a continuation-in-part application of international application PCT/EP97/00924 filed Feb. 26, 1997 and claiming priority of German application 196 08 099.1 filed Mar. 2, 1996.

BACKGROUND OF THE INVENTION

The invention relates to a flywheel energy accumulator with a vertical shaft which carries upper and lower flywheels and is supported by at least one passive super conductive magnetic axial thrust bearing. A homopolar electrodynamic machine is provided which has a rotor mechanically coupled to the flywheel, and a stator which is stationary relative to the vacuum housing of the energy accumulator.

Flywheel energy accumulator with conventional bearings have only a relatively small storage potential because of a relatively high bearing friction and the energy consumption caused thereby. With contact-free active magnetic bearings, it is necessary, on one hand, to provide an expensive and complicated electronic sensing and control system, and, on the other hand, the attenuation, which is generally insufficient, must be compensated for by the installation of additional eddy current dampers.

Another disadvantage resides in the rigidity of the bearing which increases with the rotor speed.

Because they do not have these disadvantage superconductive magnetic bearings are particularly suitable for flywheel energy accumulators because they can store electric energy with low losses. Since such bearings require no control system, they are called self-stabilizing or passive bearings. With flywheel energy accumulators electric energy is converted in a motor/generator unit into kinetic energy and is stored in a strong flywheel disc. It is important in this connection that the losses in the storing phase are minimized in order to prevent the discharge that is the loss of the energy. For this reason, the rotor of the system is supported on the superconductive magnets referred to earlier in a contact-free manner. Such a system is known, for example, from Bornemann, H. J. et al., "Schwungradenergiespeicher mit passiven supraleitenden magnetischen Lagern", (Flywheel energy accumulator with passive, superconductive magnetic bearings), KFK-Nachrichten 26 issue March 1994 pages 209–214.

It is the object of the present invention to provide such a flywheel energy accumulator which, on one hand, has minimal energy losses and, on the other hand, has a high energy storage capacity.

SUMMARY OF THE INVENTION

In a flywheel energy accumulator comprising a vertical shaft rotatably supported in a vacuum housing by superconductive magnetic axial support bearings, lower and upper flywheels are mounted on the shaft in axially spaced relationship, a homopolar dynamic machine with a rotating magnetic field is disposed in the space between the flywheels and includes a stator supported in, or forming part of, the housing and a rotor mounted on the shaft so as to be disposed within the rotor, and the superconductive magnetic support bearings include a lower passive axial thrust bearing with an annular magnet disposed below the lower flywheel and an upper positive axial pull bearing with an annular magnet disposed above the upper flywheel and disc-shaped superconductors disposed adjacent the annular magnets such that both bearings provide magnetic forces jointly counter-acting the gravity forces of the shaft, the rotor and the flywheels.

The invention will become more readily apparent from the following description of a preferred embodiment thereof described, by way of example, with reference to the accompanying drawings.

DESCRIPTION OF A PREFERRED EMBODIMENT

Flywheel energy accumulators of the type referred to above generally include the following components: a flywheel disc, superconductive magnetic bearings, a drive unit which is normally a synchronous motor, a vacuum housing with an evacuation system for receiving the components and also the associated pumps and sensors. In contrast to the state-of-the-art, in the arrangement according to the invention a homopolar machine is used as the drive unit.

Figure 1:
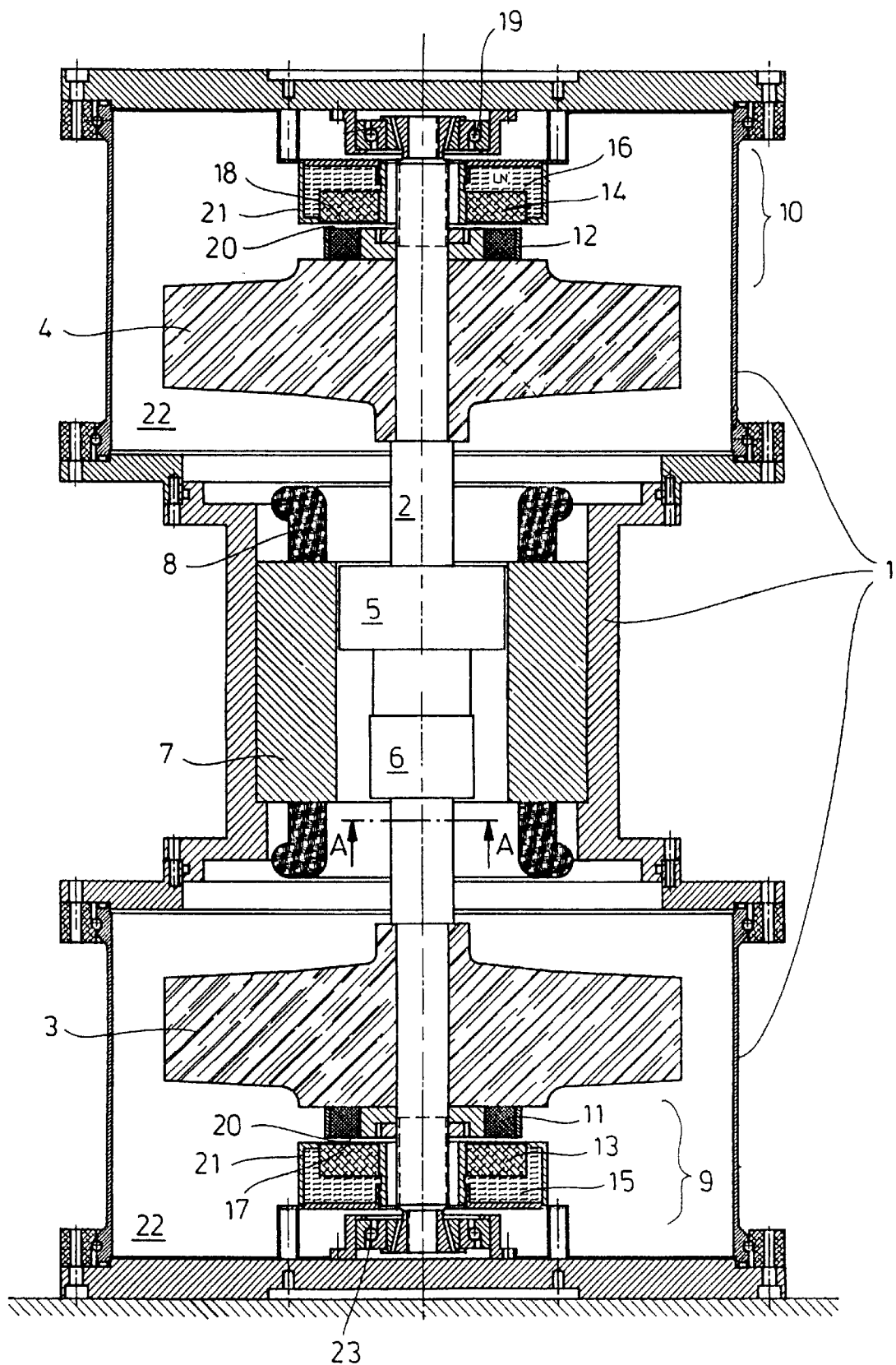
FIG. 1 is an axial cross-sectional view of the energy storage accumulator.
Figure 2:
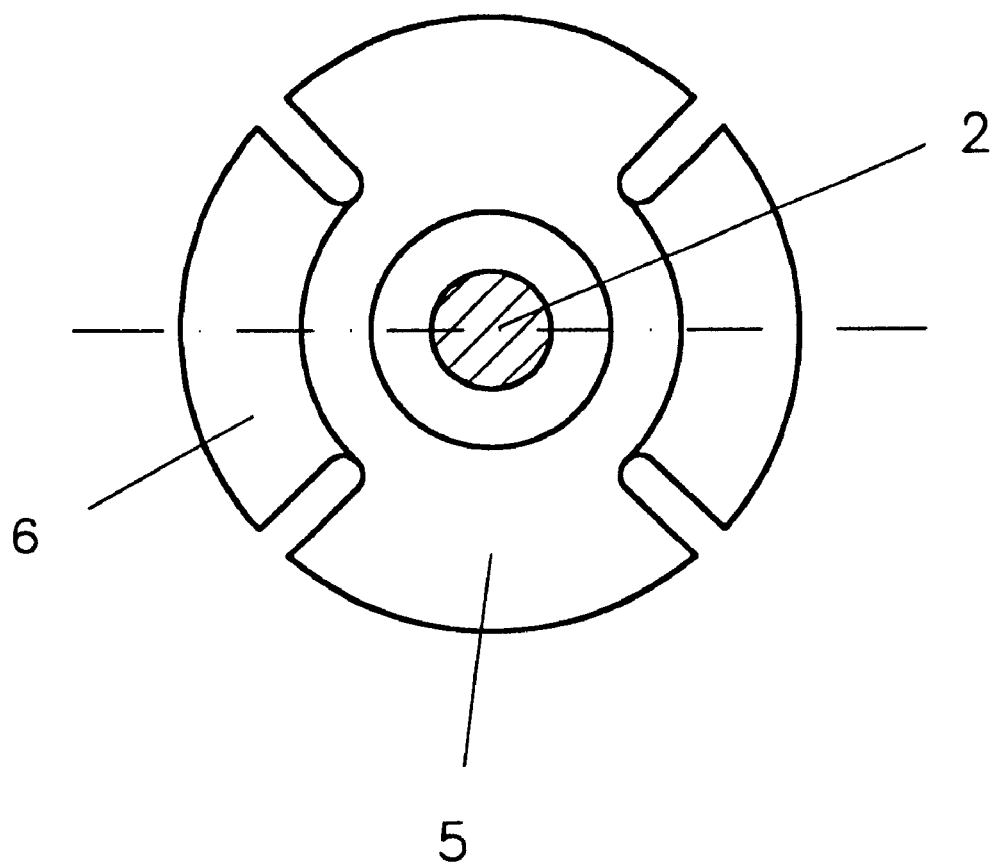
FIG. 2 is a cross-sectional view taken along line A—A of FIG. 1.

In the embodiment as shown in FIG. 1, the flywheel energy accumulator is disposed within a vacuum chamber 21 of a sealed vacuum housing 1. However, for cryotechnical reasons, for example to prevent icing, it would be sufficient if only the superconductive magnetic bearings would be each disposed in relatively small vacuum chambers. The friction can however be reduced if also the flywheel and the shaft are disposed in vacuum chamber. The principal element of the energy accumulator is the vertical rotatable shaft 2 on which two flywheels are mounted in spaced relationship, a lower flywheel 3 and an upper flywheel 4, the shaft 2 extending through, and having opposite ends projecting from, the flywheels 3 and 4. The flywheels 3 and 4 may consist of a material other than the shaft 2. The two flywheels 3 and 4 may have the same shapes and dimensions. It is particularly advantageous if they have both the same weight and are arranged symmetrically with respect to each other. Between the two flywheels 3 and 4, the shaft 2 carries the rotor of an internal-rotor homopolar dynamoelectric machine acting as an electromotor and as a generator which comprises the pole elements 5 and 6 displaced by 90° with respect to each other. The two pole elements 5 and 6 have a smaller width than height and are arranged symmetrically and with a certain distance from each other (see FIG. 2).

The pole elements 5 and 6 of the rotor are part of the shaft 2 and are surrounded by the stator 7 of the homopolar machine which stator is firmly mounted in the housing 1 or forms part of the housing 1. The stator 7 includes coils 8 which generate in the stator a rotating magnetic field which causes the pole-elements 5 and 6 and, together therewith, the shaft 2 to rotate. In this manner, the electric energy supplied to the coils 8 is converted into rotation energy of the flywheels 3 and 4.

Essential elements of the flywheel energy accumulator are the two superconductive axial thrust bearings that is the lower axial thrust bearing 9 and the upper axial thrust bearing 10. Each bearing 9,10 includes an annular permanent magnet 11, 12 mounted for rotation with the shaft 2, and a stationary superconductor 13, 14 disposed in a cryostat 15, 16. The superconductors 13, 14 have an annular shape like the permanent magnets 11 and 12 and are, at their sides, so embedded into the cryostats 15 and 16 that one of their outer sides 17 and 18 is disposed opposite the permanent magnet 11 and 12. They are disposed on the shaft 2 below the lower flywheel 3 and the upper flywheel 4 in such a way that a narrow gap 20 remains between their outer surface and the outer sides 17, 18 of the cryostats 15 and 16. This gap 20 is also present when the machine is at a standstill. Consequently, at the outer sides of each flywheel 3 and 4, there is a magnet 11 and 12 respectively, which is rotatable together with the respective flywheel 3, 4 and is disposed at a distance from the respective superconductor 15, 16, which is supported in the housing 1 in a stationary fashion. In this way, a superconductive lower passive axial thrust bearing 9 and, correspondingly an upper bearing 10 in the form of an axial pull bearing are provided for overcoming the gravity forces of the rotor.

There are no radial bearings in the flywheel energy accumulator since the superconductive axial bearings 9, 11 and 10, 12 generate also radial forces that is they provide also for radial positioning of the rotor. Nevertheless, certain precautions must be made for the radial stabilization of the rotor for stability reasons. To minimize instabilities during operation, the polar inertia moment $I_{pol}$ should differ as much as possible from the equatorial inertia moment $I_{equ}$ of the rotating parts, that is, the flywheels 3, 4, the shaft 2 and the pole elements 5, 6. A factor 2 has been found to be suitable. That means that the rotating structure should be flat and expansive or elongated. In the present case, wherein the rotor includes two flywheels 3, 4 with the pole elements 5, 6 and the shaft disposed therebetween this means:

$$L \geq \sqrt{3}*R$$

Wherein L is the distance between the mass center points of the two flywheels and R is the radius of the flywheels.

The cryostats 15 and 16 are operated in a well known manner, which is therefore not described herein. They include a casing 21 and are thermally insulated against the ambient by the vacuum space 22 in the housing 1. The superconductive bearings 9 and 10 are cooled either by liquid nitrogen flowing through the bearings or by direct contact with heat conductors extending from a Sterling cooler. The energy supply to the cooling apparatus can be derived directly from the flywheels.

In addition to the superconductive magnetic bearings 9 and 10 axial grooved ball bearings 19 and 23 are provided at the upper and the lower ends of the shaft 2 which support the shaft 2 with the flywheels and the rotor if the superconductive magnetic bearings 9 and 10 should fail. These bearings 19 and 23, however, are not utilized during normal operation of the flywheel energy accumulator, that is, operation of the flywheel energy accumulator is normally not affected by the friction of the ball bearings 19 and 23.

With the symmetrical arrangement of the flywheels 3 and 4 with respect to the machine components 5, 6, 7, the flywheel energy accumulator becomes particularly compact and the load on the two bearings 9 and 10 at the ends of the shaft 2 is about the same. Although the drive and the flywheels are integrally designed and constructed their design is flexible and the relative dimensions are independent so that an adjustment to various operating conditions is easily possible. There may be provided for example a relatively small machine with high energy storage capacity, or a relatively large machine with medium energy storage capacity and a high short term over-load capability. The adaptability of course also includes the possibility of assembling large plants from modules in an advanatageous manner. With the arrangement according to the invention in which the inertia masses of both flywheels 3 and 4 are the same and the same magnetic bearings 9 and 10 consisting of single-piece superconductors and magnets can be used, the number of different component is reduced. This is particularly advantageous with regard to the superconductive structures since divided superconductors and magnets generate stray fields at their joints which result in substantial friction losses in rotating systems by magnetic hysteresis losses.

The electrodynamic machine, that is, the motor/generator 5, 6, 7 is de-energized during an energy storage phase, that is, when the flywheels are in an energy storage phase in order to prevent eddy current losses. By the operation of the flywheels and the dynamoelectric machine in a vacuum, there are practically no air friction losses. The operation of the system at high speed is important for a high efficiency of the apparatus since this provides for an advantageous power- and energy weight with a concurrent optimal utilization of the flywheel materials. In comparison with a system having the same storage capacity at lower flywheel speeds lower flywheel masses can be used. As a result, the magnetic bearings can be smaller. The size of the magnetic bearings has a large influence on the magnetic friction losses. For levitating larger masses, the magnetic bearings must be accordingly larger. Important herefor is the active surface of the magnetic material and of the superconductive material. For a total rotor weight of 10 kg, an annular magnet of about 100 mm diameter is required. This is also the largest diameter at which commercially available annular magnets consist of a single piece. For larger diameters, the magnets consist of individual segments which results in the disadvantages referred to earlier. With the arrangement according to the invention, however, the use of single-piece magnets is possible.

What is claimed is:

1. A flywheel energy accumulator comprising a vacuum housing, a vertical shaft rotatably supported in said housing by superconductive magnetic axial support bearings, lower and upper flywheels mounted on said shaft in axially spaced relationship, a homopolar electrodynamic machine with a rotating magnetic field disposed in the space between said spaced flywheels and having a stator supported in, or forming parts of, said housing and a rotor mounted on said shaft so as to be disposed within said stator, said superconductive magnetic bearings including a lower passive axial thrust bearing with a lower annular permanent magnet disposed below the lower flywheel, an annular superconductor embedded in a cryostat and being disposed adjacent to, and below, said lower annular permanent magnet and providing repulsion forces and an upper passive axial pull bearing with an upper annular magnet disposed above said upper flywheel, an annular superconductor embedded in a cryostat and being disposed adjacent to, and above, said upper annular permanent magnet and providing attraction forces, such that both bearings jointly counteract the gravity forces of said rotor, said flywheels having a predetermined radius R and mass center points which are disposed at a distance L from each other, the distance L between the flwyheel mass center points being determined by $$L \geq \sqrt{3} \times R.$$

2. A flywheel energy accumulator according to claim 1, wherein said rotor comprises two pole elements which are displaced by 90° with respect to each other and which have a greater width than height and are arranged at a predetermined distance from, and symmetrically with respect to, each other.

3. A flywheel energy accumulator according to claim 1, wherein said shaft, said rotor and said flywheels which together form the moving part have a polar inertia moment $I_{pol}$ which is different from the equatorial inertia moment $I_{equ}$ by a predetermined factor.

4. A flywheel energy accumulator according to claim 3, wherein said factor is about two.

5. A flywheel energy accumulator according to claim 1, wherein both said axial bearings are the same.

6. A flywheel energy accumulator according to claim 1, wherein said shaft extends through, and projects from, the opposite sides of said flywheels.

7. A flywheel energy accumulator according to claim 1, wherein said flywheels are identical in their shape, their dimensions and their weight.

* * * * *